Jan. 14, 1941.   E. W. MILLER   2,228,966
GEAR FINISHING TOOL
Filed April 16, 1936   2 Sheets-Sheet 1
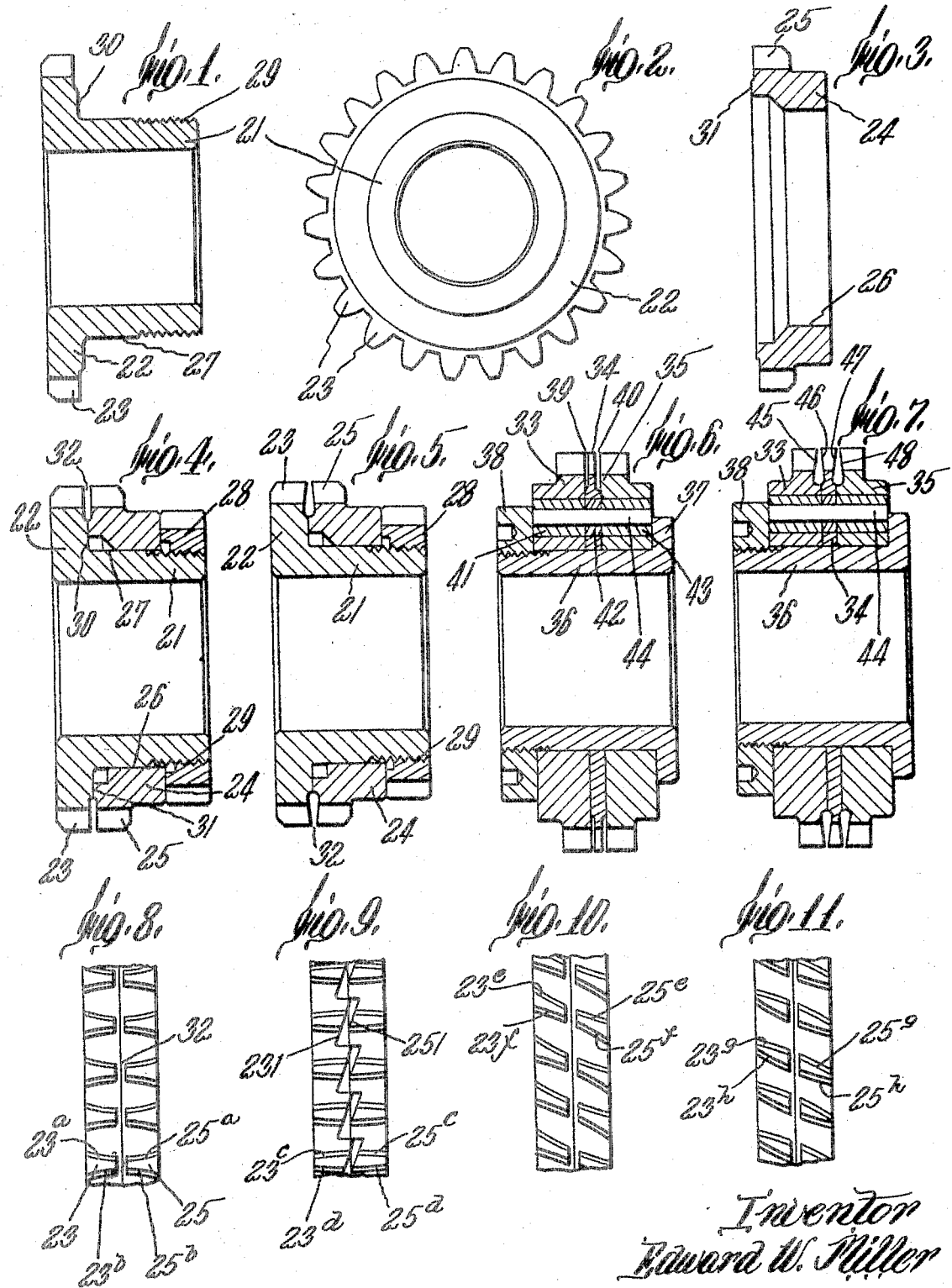
Inventor
Edward W. Miller

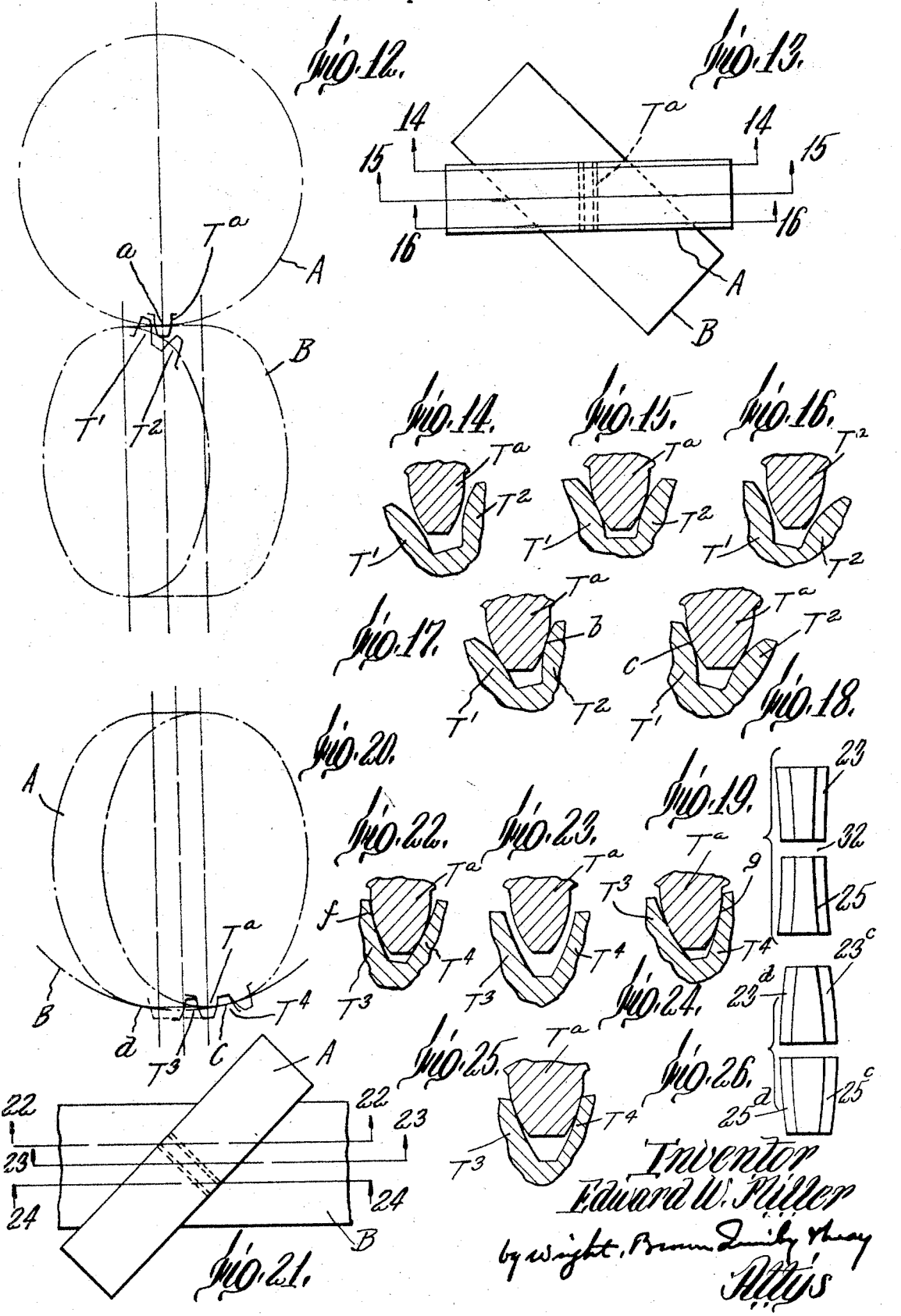

Patented Jan. 14, 1941

2,228,966

UNITED STATES PATENT OFFICE 2,228,966

GEAR FINISHING TOOL

Edward W. Miller, Springfield, Vt., assignor to The Fellows Gear Shaper Company, Springfield, Vt., a corporation of Vermont Application April 16, 1936, Serial No. 74,614

8 Claims. (Cl. 29—104)

The subject of this invention is a tool for finishing gears to a high order of accuracy and smoothness by a combined action of shaving or scraping and burnishing. It embodies teeth conjugate to the teeth of the gears to be finished, but so related to the work gear teeth as to mesh therewith only when the axes of the tool and work gear are placed askew to one another, and it includes cutting edges intersecting the faces of its teeth and extending in planes which are transverse to the axis of the tool. Thus when the tool and work gear run in mesh, with pressure contact between their respective teeth, the divergent paths in which such teeth travel cause the cutting edges to travel lengthwise of the work piece teeth and remove thin chips from their surfaces with a scraping action. The surfaces of the tool teeth beside the cutting edges at the same time bear on the faces of the work piece teeth, control the cutting effect by limiting the depth of penetration of such edges and preventing unequal penetration into portions of the work piece of varying hardness, and burnish these faces to a fine perfection of form and finish. Tools of this character may have teeth extending parallel to their axes, for thus finishing helical gears, or may have helical teeth for finishing straight toothed gears or helical gears of a different helix angle; and they may be appropriately formed, with specific differences of curvature, to finish in this manner either external gears or internal gears.

In earlier applications for Letters Patent of the United States filed by me on February 23, 1932, Serial No. 594,422, entitled Gear finishing cutter, and on November 19, 1935, Serial No. 50,573, entitled Method and means for finishing gears, I have explained the principles of tools of this character capable of thus finishing straight or helical teeth on external or internal gears with an extended bearing lengthwise between the teeth of the tool and work gear. The cutting edges of the tools disclosed in said prior applications are the intersections between the side faces of their teeth and grooves or slots cut into such faces, partially or entirely through the substance of the integral teeth, and in one form shown in Serial No. 594,422 are in the end faces of thin, toothed, disks assembled in a holder with intermediate spacing disks.

The object of the invention which I am about to describe is to provide tools fundamentally like those of said prior applications, but having improvements in the cutting edges, and provisions by which such cutting edges may be efficiently sharpened repeatedly after having become dulled by use. An important advantage of these improvements is the capacity to provide and maintain, throughout the useful life of the tool, a top rake at the cutting edges. This invention is a continuation in part of both said prior applications and an improvement in the particulars referred to.

The drawings furnished herewith show the principles of the invention in several of their possible embodiments, but illustratively and without intent to show all of the forms in which they may be made and all the adjuncts which may be used with them. For instance, they show externally toothed tools only, whereas the invention may be embodied equally in tools having internal teeth adapted to finish external gears.

Fig. 1 of the drawings shows an axial section of the body or main part of a cutting tool embodying this invention, such body carrying one of the tool units;

Fig. 2 is an end elevation of the same as seen from the right of Fig. 1;

Fig. 3 is an axial section of the cooperating unit of the tool;

Fig. 4 is a similar section of the complete tool assembled in working condition;

Fig. 5 is a similar view of a corresponding tool in which the teeth are formed with a top rake at their cutting parts;

Fig. 6 is a sectional view similar to Fig. 4 but of a different form of tool containing essentially the same invention;

Fig. 7 is a sectional view of a tool substantially like that shown in Fig. 6 but having a top rake at all its cutting edges;

Fig. 8 is a development elevation of the tool shown in Fig. 4, such tool having teeth organized to finish external helical gears;

Fig. 9 is a development elevation of a similar tool but of which the teeth are organized to finish helical internal gears; this figure illustrates further an optional character of top rake which may be given to teeth of any of the tools of this invention;

Fig. 10 is a development elevation of a tool of the same essential character but having helical teeth organized to finish external gears;

Fig. 11 is a development elevation of a helical tool of which the teeth are organized to finish internal gears;

Figs. 12 and 13 are diagrams in elevation and plan views respectively explanatory of the factors in my improved tools for finishing external gears which enable them to effect a burnishing action simultaneously with cutting when in skewed mesh with a work gear;

Figs. 14, 15 and 16 are enlarged sectional views taken on lines 14—14, 15—15 and 16—16 respectively of Fig. 13 of the intermeshing teeth of a straight toothed tool and a helical work gear lacking the provisions which I have invented for an extended bearing between the contacting teeth;

Figs. 17 and 18 are views similar to Figs. 14 and 16 respectively showing the tooth modifications which are a feature of this invention and by which extended lengthwise bearing between the teeth of the cutter and tool is obtained;

Fig. 19 is plan view of the modified cutter tooth shown in Figs. 17 and 18;

Figs. 20 and 21 are diagrams explanatory of the tooth modification which I have invented for obtaining extended bearing intermediate the ends of their teeth between a tool and an internal helical work gear in skewed meshing relation;

Figs. 22, 23 and 24 are tooth sections on an enlarged scale taken on lines 22—22, 23—23 and 24—24 respectively of Fig. 21;

Fig. 25 is a sectional view similar to Fig. 23 showing the tooth modification which is a feature of this invention by which extended bearing is obtained between the tool teeth and the teeth of an internal gear;

Fig. 26 is a plan view of the modified tooth shown in Fig. 25.

Like reference characters designate the same parts wherever they occur in all the figures.

A common characteristic of all tools embodying the present improvement over my preceding applications hereinbefore identified is that they are composed of separable toothed units having cutting edges at the ends of their teeth, which are assembled with their respectively corresponding teeth in alinement and their cutting ends opposite to one another across a narrow intervening space, while the sides of such teeth are made without side clearance so as to bear and rub on the tooth faces of the gear to be finished with which they are put in mesh. In order to perform the required work, the tools must be made of a substance sufficiently hard to provide sharp and durable cutting edges, and to apply without deformation, and with a desired minimum of wear, a sufficient burnishing pressure to the teeth of such a gear. I may use any metal alloy or other composition now known, or which may hereafter be discovered, which has these qualities in suitable measure.

The form of tool shown in Figs. 1–4 inclusive comprises a hub or sleeve 21 on one end of which is a flange 22 having external teeth 23, constituting one unit of the composite tool. The complemental or cooperative unit is an annulus 24 having external teeth 25, which is applied to the sleeve 21; the hole in this annulus having a bearing surface 26 which is finished accurately to make a close sliding fit with an external bearing surface 27 on the sleeve. The annular unit is then clamped against the flange by a nut 28 screwed on the threaded part 29 of the sleeve, as shown in Fig. 4.

The flange of the body part is provided with a shoulder 30 adjacent to the bearing surface 27, and the annular unit is provided with a complemental shoulder 31. The ends of the teeth of both units are cut back from these shoulders, so that when assembled an intervening space 32 is left between the contiguous ends of corresponding alined teeth 23 and 25 on the respective units. Such space is wide and deep enough for disposal of chips and to permit a sufficient cutting engagement of the cutting edges with the work gear teeth, but otherwise is relatively narrow. In the specific illustration here given its width is in the order of sixty thousandths of an inch. It may be formed partly in each cutter unit, as shown; but not necessarily so, for it may be initially made in one of them only.

Sharpening of the units is effected by grinding the ends of the teeth which make the boundaries of the space 32. Such grinding operation is easily effected by standard grinding equipment on each unit when separated from the other, and may be performed repeatedly and many times, whenever the edges become dull. The ability to separate the units enables the grinding to be readily performed and the sharpened units reassembled. If necessary, in order to maintain a substantially uniform width to the space 32, the shoulders 30 and 31, or one of them, may be ground away from time to time. When assembled after grinding, the teeth of the two units are accurately alined with one another before the nut 28 is tightened up to clamp the removable one. Thus alinement may be effected by any instrument or fixture capable of entering a tooth space and bearing for an extended distance along the sides of the flanking teeth, or may be effected by a key and keyway between the hub 21 and the tool unit 24. I have not shown such a key arrangement in Figs. 4 and 5 because equally accurate tooth alinement can be obtained in the manner described and a key is not necessary; but I have shown in Figs. 6 and 7 an illustrative alining key means in connection with a different form of tool.

The teeth may be formed with or without a top rake at their cutting ends. Figs. 1, 3 and 4 show the tooth ends ground in planes perpendicular to the axis of the tool; i. e., without a top rake. Fig. 5, however, shows a similar tool in which a top rake is effected by grinding on a conical or dished surface. Other modes of forming a top rake known in the art of metal cutting tools may be practised on the tools of this invention. The teeth of spur type tools may be ground at their ends on oblique planes, as illustrated in Fig. 9, making acute angles at the edges 231 of one unit and at the edges 251 of the other unit.

Attention is now directed to Figs. 6 and 7 as illustrating some of the different constructions in which the invention may be embodied. In Fig. 6 three tool units 33, 34 and 35 are mounted, all detachably, on a sleeve or hub 36 which has an abutment flange 37 at one end and is fitted with a clamp nut 38 at its other end. The units 33 and 35 are reversed duplicates of one another and the unit 34 is a disk intermediate the other two, reduced in width adjacent to its circumference to provide clearances spaces 39 and 40. In this case the shoulders to provide clearance spaces are formed initially in the intermediate unit alone. All three units have teeth of which corresponding teeth on each are alined with the others. There is also shown here a key device for effecting and maintaining tooth alinement which consists of sleeves or bushings 41, 42 and 43 set into the respective units and a pin 44 passing through the bores of all the sleeves. The sleeves are of softer metal than the tool units in order to permit machining of passageways in exact alinement with one another and to make a close fit with the pin after the several units have been hardened and finished. The cutting edges are formed at the inner ends of the teeth on the units 33 and 35, and at both ends of the teeth on the unit 34. These teeth have no top rake.

A similar tool, having top rake on its cutting edges 45, 46, 47 and 48 is shown in Fig. 7. Except for the top rake, this latter tool is exactly like the one shown in Fig. 6.

The teeth with which these tools are provided are conjugate in profile to the teeth of the gears which they are designed to finish, and are spaced with such equality to the spacing of such gear teeth as to enable the tool and work to run correctly in mesh together when mounted on fixed centers.

Tools conforming to the invention are intended to be mounted for use with their axes non intersecting and non parallel to the axes of the work gears to which they are applied, and to make extended bearing lengthwise of the work gear teeth. In other words, the tool and work are placed in skewed relationship. This is commonly called in the practical art a "crossed axis" arrangement. For that purpose helically toothed tools are provided for finishing spur gears (i. e., gears of which the teeth are parallel with the axis), and either spur type or helical tools to finish helical gears. Helical tools may be used with helical gears when the helix angle of the gear teeth is different from that of the tool. In all such cases therefore the teeth of the tool travel in a path which converges toward the path of the work gear teeth as they pass into mesh, and diverges when the teeth pass out of mesh, wherefore a lengthwise slip occurs between contacting teeth, which causes the desired cutting effect.

In order to obtain an extended lengthwise bearing between contacting teeth and thus burnish and limit the depth of cutting, the side faces of the tool teeth are bowed longitudinally and oppositely to one another at opposite sides, with a curvature of which the degree is dependent upon the skew angle. In the case of tools provided for finishing external gears the bowing is concave, and of tools for finishing internal gears is convex. The characteristics in this respect of externally toothed tools of the spur type and helical type respectively are shown in Figs. 8, 9, 10 and 11, with exaggeration of the curvature to make it more plainly evident.

Fig. 8 may be considered as a side elevation, developed into a plane, of a tool such as that shown in Fig. 4, designed to make extended longitudinal bearing with the teeth of an external helical gear. The teeth of its respective units are designated by numerals 23 and 25 as in the preceding figures. The opposite side faces 23a, 23b and 25a, 25b of each tooth are concave in the longitudinal direction with substantially equal and symmetrical concavity. But in all planes perpendicular to the axis the face curves are conjugate to the curves to be generated in the work gear. The corresponding longitudinal curves of alined teeth are segments of the same curve, interrupted by the intermediate space 32. Such curvature is nearly but not exactly circular.

Fig. 9 shows in a similar manner the variation suitable for finishing internal gears. Here the side faces 23c, 23d, 25c and 25d are convex with a nearly or substantially circular curvature and with corresponding faces of the alined teeth on the cutter units in exact continuation of one another.

A helically toothed tool for finishing external gears shown in Fig. 10, and a corresponding tool for internal gears shown in Fig. 11, have the same essential characteristics of longitudinal concavity and convexity respectively with this difference, that the bowed curves are superimposed on the tooth face helices, modifying such helices accordingly. The median helicoids of these teeth are true helicoids, while their face curves are modified as required to give symmetrical gradations in tooth thickness with respect to the median helicoid. The curves 23e and 25e are continuing parts of the same longitudinal concave curve on one side of the teeth, and the opposite longitudinal concave face curves 23f and 25f are likewise in continuation with one another with opposite and symmetrical curvature. Correspondingly the curves 23g and 25g, 23h and 25h are continuation curves modified from helicoids by symmetrical and opposite convexity. Although the concavity or convexity of the bowed formation in tools of the size shown in these drawings is of relatively small magnitude, nevertheless it is clearly apparent and measurable, and its presence accomplishes an accuracy in the dimensions of the finished work and a smoothness and perfection of surface finish with an operating economy not obtainable otherwise.

In all cases the tooth profiles of any one tooth in all parallel planes transverse to the tooth length, are conjugate to the profiles required of the gears to be finished.

By way of definition I would point out that the spur type tools of Figs. 8 and 9, while differing from spur gears by virtue of their bowed tooth faces, are like such gears in that the median lines of their teeth are straight and parallel with the axis. Hence for the purposes of this specification any words indicating that a tooth of a tool is straight are to be understood as referring to the median longitudinal line of the tooth, or the median longitudinal plane. They are not to be construed, unless the context so requires, as meaning that the side faces of the teeth or the longitudinal elements of such faces are straight.

Tools made of three or more units, like those shown in Figs. 6 and 7, have the same character of bowed curvature in spur and helical types as above explained, and the sides of alined teeth form segments of the same or the like interrupted curves.

I refer now to the diagrams which accompany these drawings for further explanation of the character and utility of the bowed tooth formation. Let it be assumed that in Figs. 12 and 13 the cylinder A represents the pitch cylinder of a gear having spur teeth of which the tooth face elements are straight and parallel to the axis, that B represents the pitch circle of a conjugate helical gear, and that Ta represents a tooth of the first gear in mid mesh with two flanking teeth T1 and T2 of the other gear. The axes of the gears are askew to one another at an angle corresponding to the helix angle of the teeth T1, T2. Cylinders to related are tangent to one another at a single point $a$, which is the point where the common perpendicular to their two axes intersects their cylindrical faces. From this point, in either direction lengthwise of the intermeshing teeth, the pitch cylinders diverge and their center distance increases. Hence, while the tooth Ta makes full mesh with the flanking teeth at the plane 15, 15, which includes the tangent point and common perpendicular, as shown in Fig. 15, it extends out of mesh at both ends, as shown by Figs. 14 and 16. This is a condition which exists with all gears having teeth of uniform thickness from end to end and intermeshing on skewed axes; the contact is limited to virtually a point tangent contact. Owing to the compressibility of the metal the actual contact is a spot of measurable dimensions, but at most it is of very limited dimensions. It shifts in a diagonal line lengthwise and radially of the teeth in the course of their intermeshing action, but the contact at any instant of time is always such a point or spot of limited area.

In making a tool such as that shown in Fig. 8, the ends of the teeth are widened so that they make contact, as at the points $b$ and $c$ in Figs. 17 and 18, in planes corresponding to those shown at 14, 14 and 15, 15 in Fig. 13; and the thickness is increased proportionally in other planes, so that simultaneous contact bearing exists in a line extending throughout the overlapping lengths of the teeth of the tool and work within the length of the arc of contact. The arc of contact is the arc around the center of a gear, throughout the traverse of which the teeth of that gear make contact with teeth of the mating gear. Its limits are the intersections of the addendum circumference of such gear with the lines of action. In the case of tools and work gears of which the teeth are so long, the skew angle so large, or the pitch radius so short, that the ends of any tooth are outside the limits of the arc of action when its mid part is midway of the arc of action, it is not possible to obtain simultaneous contact throughout the length in common of the tool and gear teeth. But in other cases this is possible; and in all cases (except where the modifications later described are used) so much of the lengths of the mating teeth as lie within such limits make simultaneous uniform bearing. References in the balance of this specification and the claims to a bearing throughout the overlapping length of mating teeth are to be understood with the qualification above explained; i. e., that the bearing ends at the bounds of the arc of contact. The varying thicknesses by which such extended bearing is obtained is the measure of the bowed curvature previously described. It is shown in Fig. 19 with a close approximation to its actual amount with teeth of the dimensions shown in Figs. 16, 17 and 18, and a skew angle such as shown in Fig. 13.

The case of a straight spur gear in mesh with an internal helical gear is explained in Figs. 20–24. The pitch cylinder A of an external gear makes contact with the pitch circle B of an internal gear, when their axes are at a skew angle to one another, at separated tangent points $c$ and $d$ at the ends of the shorter cylinder, and between these tangent points the pitch cylinders are separated. A spur tooth $Ta$ on pitch cylinder A (which is assumed to be the shorter cylinder) makes full mesh at its ends only with the internal gear, as at the points $f$ and $g$ in Figs. 22 and 24, while at its mid point, and at all other points where the center distance is less, it makes no contact (see Fig. 23).

By making the teeth of my finishing tool progressively thicker from both ends toward the middle, or thinner from the middle toward both ends, as represented in Fig. 25 in comparison with Figs. 22 and 24, I am able to obtain an extended bearing in this case as well as in that previously described, from end to end of the overlapping length of the teeth, and particularly to obtain a cutting effect by edges midway, and elsewhere, between the ends of the teeth. Such progressive variation of thickness is the measure of the convex bowing of the teeth of a cutter for finishing internal gears. A near approach to the actual proportions of one such tooth are shown in Fig. 26.

Helical teeth in tools for acting on straight teeth, or teeth of relatively different helix angle, are correspondingly varied in thickness in accordance with the same principles and explanation.

It is part of my invention also to vary the radial height of the teeth and depth of the spaces between them in a similar manner so as to obtain uniform depth of mesh throughout the overlapping length of tool and work gear teeth, thus making the outer circumference of the tools for external work spheroidally concave and those for internal work spheroidally convex, but I have omitted illustration of this feature, both for simplicity and also because it is an optional measure not generally used.

A modification of the principle thus explained involves making the convex sided teeth more convex and the concave sided teeth less concave than that which effects equal and uniform bearing throughout their length, in order to effect a more concentrated pressure contact adjacent to their cutting edges than elsewhere, while still maintaining a bearing length greatly in excess of that obtainable with non bowed tooth faces. This modification is useful in cases where a heavy unit pressure is desired but it is not advisable to apply so great a total pressure between the tool and work gear as would be necessary if the bearing were uniform.

The invention also comprises tools having internal teeth, either straight (in the sense hereinbefore defined), or helical, with characteristics of separability for sharpening and sides bowed in the longitudinal direction. A tool of this character corresponding to that illustrated in Figs. 1–4 consists of cylindrical sleeve or housing having an integral internal flange at one end, formed with teeth at its interior circumference, an internal cylindrical bearing adjacent to such flange, and an internal thread extending inward from the end opposite to the toothed flange. The separable member is an annulus fitted externally to such bearing surface and having internal teeth in an alinement and continuation of its side faces with the teeth of the flange, similar to that existing between the teeth 23 and 25 previously described. Or internal annular units corresponding to those shown in Figs. 6 and 7 may be similarly combined with the interior of a sleeve having an internal abutment flange at one end and equipped with an internal clamp nut in threaded engagement with its other end.

The character of bowed face curvature of the teeth of such an internal tool may be readily understood by considering teeth such as those represented at T3 and T4 in Figs. 20, 22, 23 and 24 as being thickened in the mid portion to make contact there with a tooth, as the tooth $Ta$, having uniform thickness, and the teeth T3 and T4 being of suitably less thickness at other points to effect extended bearing to the desired distance either way from the mid portion. That is, the teeth of the internal tool are bowed with a convex longitudinal curvature of similar character to that illustrated in Figs. 9, 11 and 26, and of a degree appropriate to the skew angle at which the tool is designed to be run in mesh with the work gear.

The bowed characteristics not only permit engagement of cutting edges at mid length, or other intermediate points, in an externally toothed tool with an internal work piece, or vice versa (a result which is not possible otherwise), but in all cases they effect burnishing contact adjacent to such edges and extend the contact so that the slip of the intermeshing teeth in rolling together burnishes the faces of the work gear teeth over a wide area. The line of burnishing contact sweeps in the root-to-tip direction, or the opposite direction, of the work gear teeth at the same time that it is transferred endwise, and the cutting traverse also effected endwise, by the divergent paths of the intermeshing teeth. If the cutter or the work gear is gradually shifted in the axial direction of the latter while the operation proceeds, a uniform cutting and burnishing effect may be performed throughout the length of the work gears, however great such length may be. These characteristics are combined in this invention with the ability to maintain sharp cutting edges and a top rake of any character desired in connection with all or any selected ones of the cutting edges.

Tools of this character are preferably provided with a hunting tooth; i. e., with respect to work gears for which specific tools are provided, the number of teeth of the tool bears such a ratio to the number of teeth of the work gear that different individual teeth of tool and work gear come into mesh on successive revolutions, and eventually each tooth of the tool is brought into mesh with all of the teeth of the work gear. Thus the work gears are finished to the highest practicable degree of accuracy and perfection as to uniformity of tooth dimensions, spacing and concentricity with the axis.

What I claim and desire to secure by Letters Patent is:

1. A gear finishing tool comprising a plurality of separable externally toothed units assembled in axial alinement with the teeth of each unit in central alinement with the teeth of the other unit and having cutting edges on their adjacent ends which are separated by an intervening space, the teeth of said units being of a curvature in profile, at all parts of their length, conjugate to the teeth of a given work gear, and having their opposite sides symmetrically and oppositely bowed in the longitudinal direction, the corresponding sides of alined teeth in all the units being continuations of the same curves.

2. A gear finishing tool as set forth in claim 1, in which the alined teeth of said units are arranged so that their median lines are parallel to the axis of the tool.

3. A gear finishing tool as set forth in claim 1, in which the median lines of the alined teeth of all the units are helices surrounding the axis of the tool.

4. A gear finishing tool as set forth in claim 1, in which the longitudinal curvature of the alined tooth faces is concave.

5. A gear finishing tool as set forth in claim 1, in which the longitudinal curvature of the alined tooth faces is convex.

6. A gear finishing tool having teeth adapted to run in mesh with a work gear when placed with its axis non intersecting and inclined to the axis of such work gear, which teeth are of such longitudinally bowed curvature in their opposite sides as to bear both in a region intermediate their ends and with an extended bearing from such region on the flanking teeth of the work gear when in full mesh, said tool being constructed of separable units in axial alinement having teeth which collectively form the teeth of the complete tool, the teeth of the respective units being located in alinement and having cutting edges at their adjacent ends, and the teeth of at least one of the sections having a top rake at the cutting end.

7. A gear finishing tool comprising a plurality of cutter units, each having a series of gear-like teeth provided with cutting edges at one end, means for holding said units together in axial alinement with the contiguous ends of their respective teeth separated by an intervening space, and a key device in engagement with the respective units arranged to maintain their corresponding teeth in alinement with one another, the opposite side faces of such alined teeth being segments of longitudinal continuation curves, which curves are of opposite and substantially symmetrical curvature in opposite sides of the same teeth.

8. A gear finishing tool consisting of a sleeve having an integral flange at one end containing teeth similar to gear teeth in its circumference, a separable cutter unit mounted on said sleeve in abutting engagement with said flange and having teeth in its circumference in alinement respectively with corresponding teeth of the flange, the adjacent ends of the teeth on said flange and separable unit being separated from one another and provided with cutting edges, and the opposite sides of said alined teeth being curved longitudinally and oppositely to one another with a curvature sufficient to effect elongated bearing engagement with the teeth of a conjugate gear to be finished when such tool and gear are meshed with one another on non parallel and non intersecting axes.

EDWARD W. MILLER.